United States Patent [19]
Hoeh

[11] Patent Number: 5,020,404
[45] Date of Patent: Jun. 4, 1991

[54] TESTING APPARATUS FOR STRAND PELLETIZING OPERATION

[76] Inventor: James A. Hoeh, 33 N. Seventh St., Sebewaing, Mich. 48759

[21] Appl. No.: 374,538

[22] Filed: Jun. 30, 1989

[51] Int. Cl.$^5$ ............................................. B26D 1/58
[52] U.S. Cl. .................................... 83/298; 83/350.2; 83/597; 83/699
[58] Field of Search .............. 83/909, 913, 356, 356.2, 83/352, 356.3, 734, 349, 699, 298, 597

[56] References Cited

U.S. PATENT DOCUMENTS

| | | | |
|---|---|---|---|
| 203,691 | 5/1878 | Adt | 83/356.2 |
| 480,638 | 8/1892 | Tarr | 83/356.2 |
| 845,212 | 2/1907 | Boron | 83/356.2 |
| 1,772,397 | 8/1930 | Krejci | 83/356.2 |
| 2,739,647 | 3/1956 | Coste | 83/356.3 |
| 2,798,550 | 7/1957 | Kubodera | 83/356 |
| 3,084,582 | 4/1963 | Anderson | 83/699 X |
| 3,151,514 | 10/1964 | Noveske | 83/356 X |
| 3,359,843 | 12/1967 | Mead | 83/349 |
| 3,442,168 | 5/1969 | Gatto | 83/356 X |
| 4,219,291 | 8/1980 | Hoeh . | |
| 4,474,336 | 10/1984 | Fleming | 83/349 X |
| 4,759,248 | 7/1988 | Müller et al. | 83/350.3 X |

Primary Examiner—Frank T. Yost
Assistant Examiner—Rinaldi Rada
Attorney, Agent, or Firm—Harness, Dickey & Pierce

[57] ABSTRACT

A manual cutting apparatus for simulating an automatic strand pelletizing operation has mechanisms for simultaneously feeding and cutting plastic strands to enable the simulation of automatic circular cutters.

11 Claims, 3 Drawing Sheets

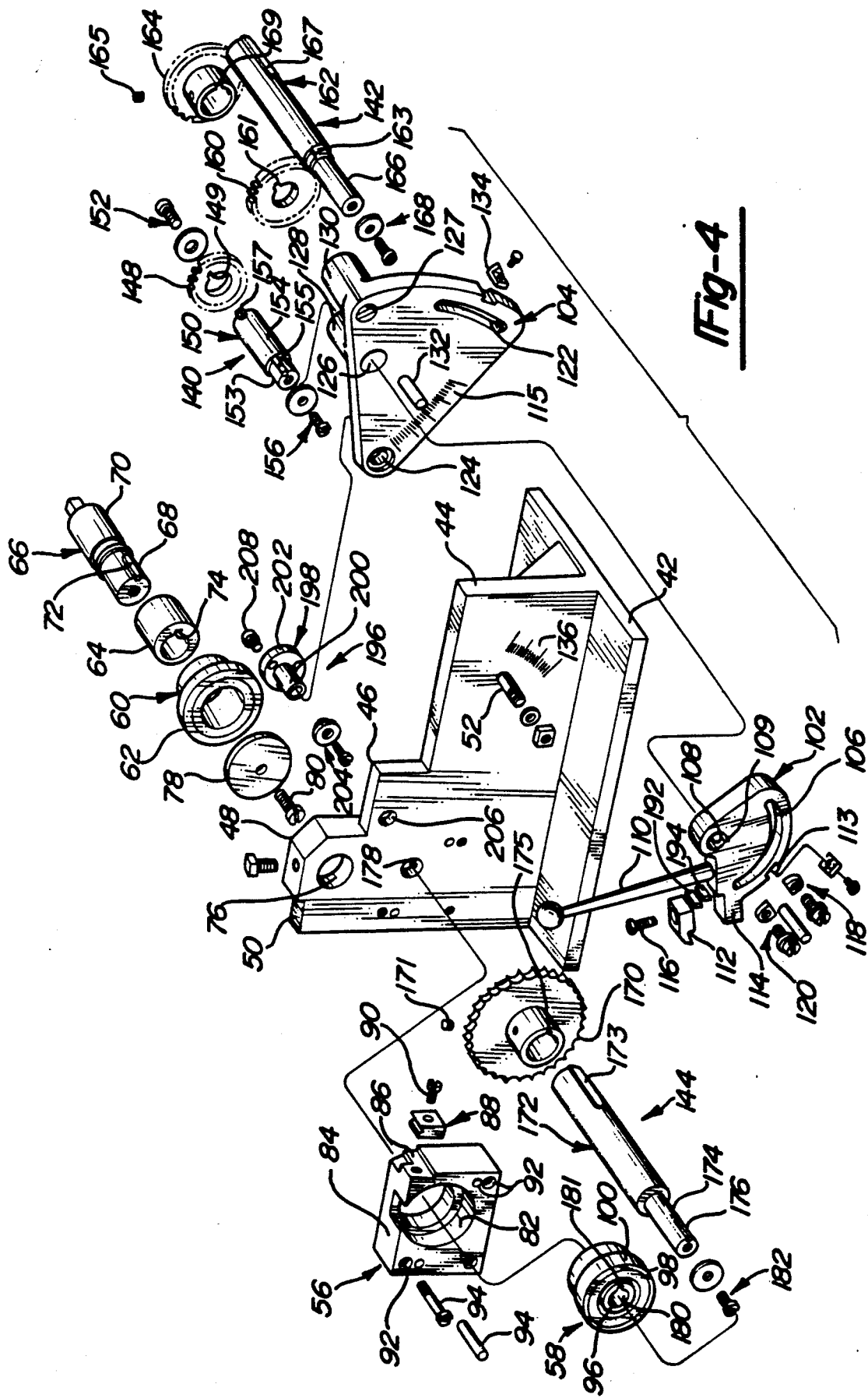

TESTING APPARATUS FOR STRAND PELLETIZING OPERATION

BACKGROUND AND SUMMARY OF THE INVENTION

The present invention generally relates to strand pelletizing cutters and, more particularly, to a manual strand pelletizing cutter use in testing operations to simulate automatic circular cutters.

Manufacturers of plastic products generally obtain plastic material for the products in the form of small plastic pellets. These pellets are fed into extruders where they are remelted, compressed and forced under high pressure into molds or through die openings to form the final products. It is important that these pellets be as uniform as possible to avoid structural variations in the product. This method of manufacturing is quite different from those industries that create the finished product by employing a wide variety of cutting and forming tools and where the principles of their design, manufacture and application are well understood.

Special cutting tools may be employed when producing materials in the form of small pellets. This is generally known as a strand pelletizing process. Many producers of pellets have failed to adopt strand pelletizing as a viable method or prematurely abandoned it in favor of another procedure due to the lack of understanding and misapplication of the cutting tools required for the last stage of the process i.e., cutting the pellets.

For a better understanding of the automatic cutting of plastic strands into pellets, refer to FIG. 1. FIG. 1 illustrates the material to be cut and the cutting components. The molten material is forced through a heated high pressure pipe line 2 to terminate at a flared nozzle 3. The nozzle 3 is capped by a plate (not shown) which allows the material to escape through a series of small holes or orifices. The orifices may be of any profile but are usually round.

The material is forced through the orifices to form strands 4 which are normally sticky when hot and might weld together if allowed to touch one another. Thus, the orifices are spaced accordingly such that the hot molten material strands 4 do not stick to one another. The sticky characteristics gradually dissipate as the material cools.

The strands 4 then descend through a trough (not shown) filled with water where the strands solidify. Guided by a series of grooved rollers (not shown), the strands emerge from the cooling bath and are captured between a feed roll 6 and a pinch roll 7. In FIG. 1, the feed roll 6 and pinch roll 7 are partially cut away to better allow an unobstructed view of the cutter 8 and bed knife 9. The feed roll continuously feeds the strands into the cutter 8 where they are severed into pellets 10 between the cutter teeth 11 and the bed knife 9.

The feed roll 6 rotates at an adjustably timed relation to the cutter 8 so as to regulate the length of the pellets 10. The force behind the molten material is also balanced with the demands of the feed roll 6 to assure that the cylindrical pellets are maintained as near as possible to the desired cross-section.

During the cutting stroke, a curve 12 is created in the strand. This curve 12 is crucial in the designing of the cutter and cutter blades. Since generally, the curve 12 is not present in a manual testing apparatus, guesses must be made as to what actually happens during cutting.

For clarity, a better explanation will be given in view of FIG. 2. FIG. 2 illustrates a cross-section view through the cutter 8. Referring to the cutting teeth 11, a relief facet or relief land 13 is formed on the back of each tooth. The land 13 or relief extends from the cutting edge 14 to the heel 15 of the tooth. The width of the land 13 surface is critical to the success of the operation of the cutter. If the land is too narrow, the forces encountered by the cutting edge 14 must be resisted by the flank angle 16 instead of the relief angle 17 causing premature breakdown of the cutting edge 14.

If the land 13 is wider than necessary to support the cutting edge 14 certain undesirable reactions may occur. The strand curve 12 begins at the point where the strand 4 leaves the feed roll 6 and continues to the point where the strand 4 is engaged by the cutter 8. The strand 4 is constantly being forced into the cutter 8 by the feed roll 6. When the strand 4 is first captured between the cutting edge 14 of a cutter tooth 11 and the bed knife 9, its forward progress is interrupted while the feed continues, as seen in FIG. 2. At this point in time, the strand curvature begins to develop and continues to increase until the strand 4 is released by the heel 15 of the cutter tooth 11 and is freed to enter the gullet 18. The period of time during which the forward progress of the strand 4 is interrupted is determined by the diameter of the strand 4, the length of the pellet and the width of the land 13. The longer the impedance, the higher arch of curvature. In FIG. 2, the arch of the strand will continue to increase until the heel 15 has passed the cutting edge of the bed knife 9.

While the forward progress of the strand 4 is interrupted, it is storing energy supplied by the feed roll 6. When the strand 4 is finally released by the heel 15, the stored energy is suddenly released and the strand 4 can fly out of control and miss its engagement with the next tooth 11 resulting in non-uniform pellets. It should also be noted that the curve may be horizontal instead of vertical, as shown in FIG. 2, in which case, the energy released by the strand may cause it to move laterally and interfere with neighboring strands with equal undesirable results. In cases where the product material is brittle and easily fractured, too much curve or arch in the strand 4 may cause it to break at the crown of the arch resulting in long pieces of the strand, called longs, appearing in the discharge.

It is possible that certain brittle materials may have failed to qualify as candidates for strand pelletizing operations merely because the lands of the cutter teeth were too wide. As previously stated, the lands are the surfaces that are reconditioned when necessary to restore sharpness of the cutting edges of the cutter teeth. Each reconditioning procedure increases the width of the land. When the land width becomes great enough to adversely effect the cutter performance it becomes necessary to rework the tool flank and the root radius to restore the land to optimum width for beginning a new cycle of sharpenings. This costly operation is called regulleting and is periodically required in the regular maintenance of any multiple tooth circular cutter.

Thus, in order to achieve optimum performance in a strand pellitizng operation, it is necessary to determine how the raw material will react during cutting. The reaction of the raw material during cutting to form the pellets can be enhanced by optimizing three parameters which are present in all strand pelletizing machines. The parameters are: the profile of the cutter teeth and the bed knife; the gap between the cutter teeth and the bed knife; and the orientation of the feed plane to the cutter axis.

To the inventor's knowledge, an apparatus does not exist which enables manual simulation of the automatic cutting of strands as above disclosed. An apparatus is needed which can take into account the above parameters without the need of designing a prototype circular cutter. Thus, it is an object of the present invention to provide a manual cutting apparatus which simulates the action of an automatic circular cutter. The present invention enables multiple settings, adjustment, or the like of its cutting mechanism to simulate the above parameters and different material to provide data to enable optimum design of circular cutters. The present invention further provides the art with an apparatus which enables the design of rotary cutters without expending a substantial sum of money on designing prototype rotary cutters.

From the subsequent detailed description taken in conjunction with the attached drawings and appended claims, other objects and advantages of the present invention will become apparent to those skilled in the art.

BRIEF DESCRIPTION OF THE DRAWINGS

FIG. 4 is an exploded perspective view of the apparatus of FIG. 3.

DETAILED DESCRIPTION OF THE PREFERRED EMBODIMENT

Figure 3:
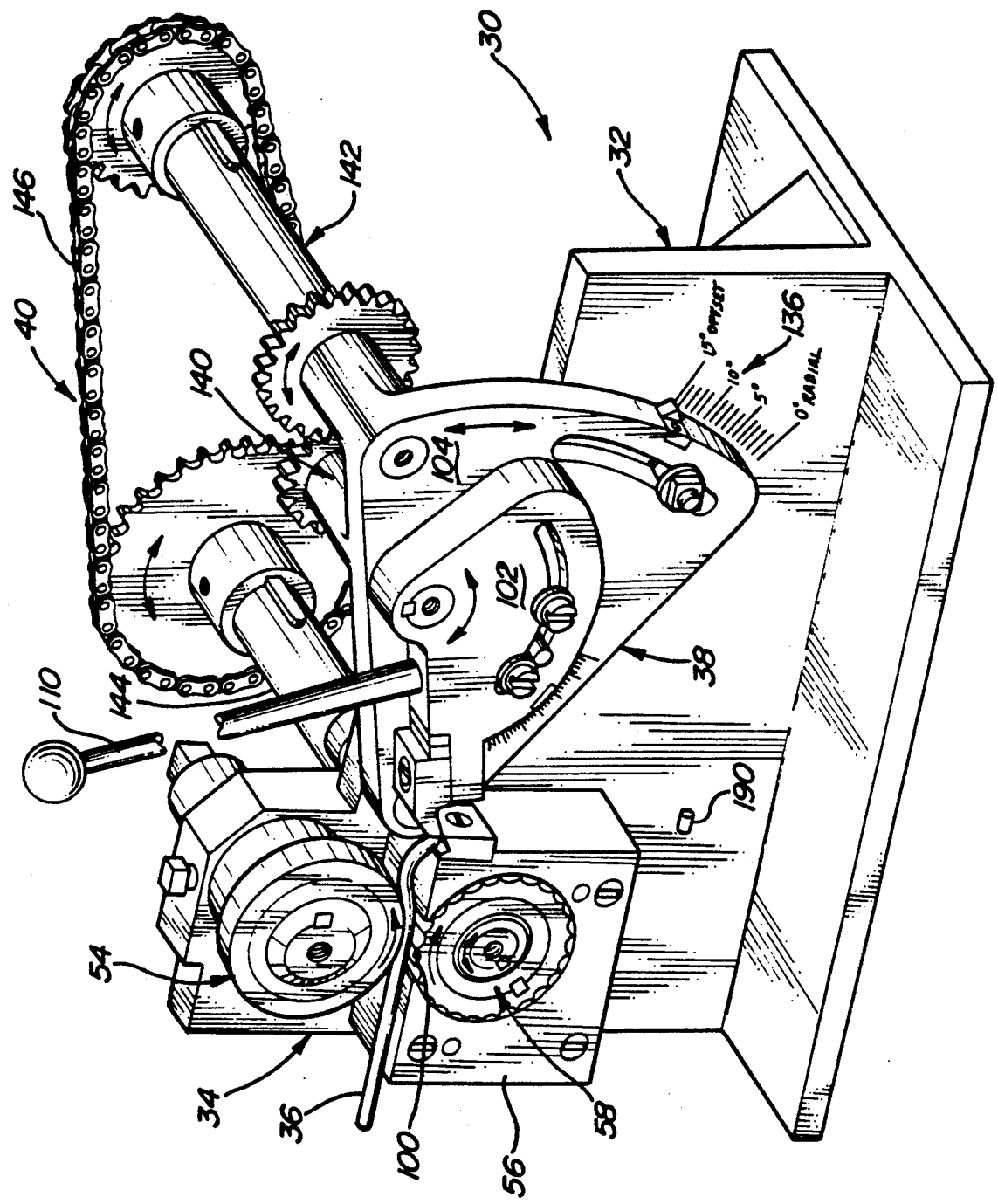
FIG. 3 is a perspective view of an apparatus in accordance with the present invention.

Turning to FIGS. 3 and 4, an apparatus in accordance with the present invention is illustrated and designated with the reference numeral 30. The apparatus 30 includes a frame 32, a mechanism 34 for feeding a strand 36 into a cutting mechanism 38 and a transmission mechanism 40 for driving the apparatus 30.

The frame 32 generally is of an inverted T-shape and formed from a metallic material. The frame 32 includes a horizontal base member 42 and a vertical member 44. The horizontal base member 42 is placed on a table, bench or the like and may be secured thereto. The vertical member 44 generally includes one or more step portions 46, 48 and 50 at its extending free end. The steps 46, 48 and 50 enable attachment of the feed mechanism 34 and the cutting mechanism 38 at different vertical levels with respect to the horizontal base member 42. The member 44 also includes several apertures enabling passage of the transmission mechanism 40 therethrough to be coupled with the feed mechanism 34. A stud 52 projects from the side of the vertical member 44 to enable securement of the cutting mechanism 38 in an adjustable position as will be discussed herein.

The feed mechanism 34 generally includes a pinch roller 54, feed table 56 and feed roller 58. The pinch roller 54 generally includes an outer race 60 having a cushioned material ring 62 on its outer surface. The race 60 is positioned on an eccentric inner race 64 which, in turn, is positioned on a shaft 66. The shaft 66 has a first 68 and second 70 diameter portion. The first diameter portion 68 includes a key 72 which fits into the key-way 74 in the inner race 64. The first diameter portion 68 is passed through the mounting frame aperture 76 until the second diameter portion 70 abuts the vertical member 44. The inner race 64 and outer race 60 are then positioned for rotation onto the smaller diameter portion 68 of the shaft 66. The inner race 64 and outer race 60 both oscillates in clockwise and counterclockwise directions. Also, a cover 78 is positioned on the end of the shaft 66 after the inner 64 and outer 60 races have been positioned thereon. A screw 80 is passed through the cover 78 and secured into the shaft 66 to enable the cover 78 to hold the inner 64 and outer 60 races against axial movement on the shaft 66.

The feed table 56 is generally rectangular having a large bore 82 for seating the feed roller 58. The feed table 56 includes a planar surface 84 which defines the feed plane of the apparatus 30. The strand 36 is positioned on the feed plane 84 and fed in between the rollers 54 and 58. The feed table 56 includes an indented portion 86 on its side for seating of a bed knife cutter 88. The bed knife cutter 88 is removably secured to the feed table 56 by a screw 90 or the like. The bed knife cutter 88 may be substituted with other bed knife cutters having different profiles to determine the bed knife cutter which optimizes the cutting of a particular strand material. The feed table 56 also includes several apertures 92 to enable fasteners 94 to pass therethrough to secure the feed table 56 to the frame vertical member 44.

The feed roller 58 is generally of the overrunning clutch type. Specifically, the feed roller 58 is what is known in the field as an indexing type of overrunning clutch. Reciprocating motion applied to the feed roller driving race 96 is transformed into intermittent motion in only one direction at the driven race 98. The roller 58 will advance or index the work on each forward stroke but will not return or back up on the return stroke. The driven race 98 of the feed roller 58 includes a narrowed serrated or knurled outer surface 100, as best seen in FIG. 3. The roller 58 is driven by the transmission 40 as will be described herein.

The cutting mechanism 38 includes a first member 102 and second member 104. The members 102 and 104 have an overall triangular shape and the first member 102 is rotatable with respect to the second member 104.

Generally the first member 102 includes an arcuate slot 106, a bore 108, a handle 110 and a cutter tooth 112. The cutter tooth 112 is removably secured to a finger projection 114 on the first member 102 by a screw 116. The cutter tooth 112 may be substituted with other cutter teeth having different profiles to determine the tooth which optimizes the cutting of a particular strand material. A pair of fasteners 118 and 120 are positioned within the arcuate slot 106 to limit the rotation of the first member 102 which, in turn, limits the rotation or movement of the cutter tooth 112.

Two interchangeable spacer blocks 192 and 194 enable movement of the cutter tooth 112 with respect to finger 114 to find the optimum gap best suited for cutting a particular strand material. One of the spacer blocks may be selected from a group of six blocks that vary in thickness in increments of 0.010 inch. The thinnest block measuring 0.100 inch and the thickest measuring 0.150 inch. The other spacer block may be selected from a group of nine blocks that vary in thickness from each other in increments of 0.001 inch. The thinnest block measuring 0.101 inch and the thickest measuring 0.109 inch. Therefore, the user is able to fix the position of the cutter tooth 112 relative to the bed knife 88 throughout a range of 0.058 inches in increments of 0.001 inch. This amount is sufficient to determine the gap best suited for the particular material. Also, other spacer blocks in increments of 0.010 inch may be added if it is necessary to increase the range of the gap.

The second member 104 includes an arcuate slot 122, bores 124, 126, 127 and a pair of shaft housings 128 and 130. The shaft housings 128 and 130 are concentric with the bores 126 and 127, respectively, to enable shafts to pass therethrough. A stud 132 projects from the member 104 to pass into the arcuate slot 106 of the first member 102 to confine movement of the first member 102 along the arcuate slot 106. A pointer 134 is secured to the second member 104 to align with a scale 136 on the vertical member 44 of the frame 32. The scale 136 and pointer 134 indicate the offset angle of the the second member 104 with respect to its axis of rotation. This offset simulates the offset of the cutting tooth of the circular cutter with its axis of rotation.

The optimum orientation of the feed plane with respect to the cutter axis, is determined by establishing two intersecting lines that form an angle called the bed knife base line angle. The bed knife base line angle is formed by the feed plane line and the bed knife base line. The feed plane line is tangent to the cutting edge of the bed knife and the top of the feed roll and coincides with the feed plane and may be infinitely extended. The bed knife base line intersects the cutting edge of the bed knife and the cutter axis.

Optimum performance of a pelletizing operation, for a particular material, will be achieved when the bed knife base line forms an angle with the feed plane line between zero and fifteen degrees. It should be noted that optimum performance cannot be obtained if the cutter axis is situated below the feed plane line.

When the axial line of member 104 is extended, it coincides with the cutting edge of the bed knife. Upon pivoting of the member 104 about its axis, various bed knife base line angles are simulated as indicated by the pointer 134 and the scale of degrees 136. In this manner the device enables the user to determine the optimum orientation of the feed plane with respect to the cutter axis for a particular material.

Also, simulations of how material will react to circular cutters that have various numbers of teeth on their periphery may be conducted. Fasteners 118 and 120 are fixed in position to limit the movement of the cutter through a predetermined degree of arc that corresponds to the degrees of separation of the teeth around the periphery of a multiple toothed circular cutter that may be under consideration. A pointer 113 and degree scale 115 similar to that shown at 134 and 136 may be incorporated on members 102 and 104 in order to indicate degrees. When the cutter has completed the cut, it may be returned through the selected number of degrees of arc at which point it will represent the following tooth of a multiple toothed circular cutter without affecting its relationship to the strand and the next cutting stroke may be carried out with the strand in correct relation to the cutter.

The transmission 40 includes three gear mechanisms 140, 142 and 144. The gear mechanism 140 is rotatably meshed with the gear mechanism 142. The gear mechanism 142 is rotatably coupled with the gear mechanism 144 via a chain 146.

The gear mechanism 140 includes a drive gear 148 secured to a shaft 150. The shaft 150 has a first smaller portion 153 with a key 155 and a second larger portion 154 also with a key 157 to mesh with the key-way 149 of gear 148 to secure the gear 148 on the shaft 150. A fastener 152 secures the gear 148 onto the shaft 150 against axial movement. The shaft 150 is passed into the shaft housing 128 until the larger portion 154 abuts the second member 104. The smaller diameter portion 152 extends from the second member 104. The first member 102 is secured via key 155 and key-way 109 to the small diameter portion 153 of shaft 150. A fastener 156 further secures the first member 102 onto the shaft 150 and prevents axial movement of the first member 102 on the shaft 150.

The gear mechanism 142 includes a driven gear 160, a shaft 162 and a drive sprocket 164. The driven gear 160 is positioned on a smaller diameter portion 166 of the shaft 162 and secured thereto by the key 163 and key-way 161 system. The driven gear 160 meshes with the drive gear 148 as illustrated in FIG. 3. The shaft 162 is positioned in shaft housing 130 for rotational movement therein and is secured against axial movement by fastener 168. The drive sprocket 164 is interlocked on the shaft 162 via a key 167 and key-way 169 system. Also, a set screw 165 or the like may be used to secure the drive sprocket 164 onto the shaft 162 against axial movement.

The gear mechanism 144 includes a driven sprocket 170 and a shaft 172. The driven sprocket 170 is secured to the shaft 172 via a key 173 and key-way 175 system. Also, a set screw 171 may be used to prevent axial movement of the sprocket 170. The shaft 172 includes a smaller diameter portion 174 having a key 176 thereon. The shaft 172 is positioned through an aperture 178 in the vertical member 44 of the frame 32. The smaller portion 174 of the shaft is positioned in the inner bore 180 of the feed roller 58. The key 176 meshes with the key-way 181 in the inner bore 180 of the roller 58. Also, a fastener 182 is used to prevent axial movement of the feed roller 58 on the shaft 172.

A pivot mechanism 196 pivotally retains the second member 104 on the vertical member 44 of the base 32. The pivot mechanism 196 includes a pin 198 with a shaft 200 and a retainer 202 and a fastener 204. The shaft 200 is passed through an aperture 206 in the vertical member 44 and extends therethrough. The second member 104 is positioned on the shaft 200 via bore 124 for pivotal movement and secured against axial movement via fastener 204. A screw 208 may be secured into pin 198.

It should be noted that the drive gear 148, driven gear 160, drive sprocket 164, and driven sprocket 170 are driven by handle 110 in a reciprocating clockwise or counterclockwise rotational fashion. In operation, the handle 110 is moved downwardly so that the cutting tooth 112 contacts the strand 36 between the cutting tooth 112 and the bed knife cutter 88. As illustrated in FIG. 3, the strand 136 is arched and forced into the cutter tooth 112 by the rollers 54 and 58 to simulate the cutting position of a strand in an automatic circular cutter as discussed above. Thus, the apparatus enables simulation of the automatic circular cutter.

As the handle 110 is moved downward and the first member 102 is rotated, the first member 102 will only move through the portion of the slot 106 provided between fasteners 120 and 118, and the movement thereof being further limited by the stud 132 as seen in FIG. 3. As the first member 102 is rotated, the shaft 150 is also rotated. The rotation of the shaft 150 rotates the drive gear 148 which is meshed with the driven gear 160. Thus, the rotation of the handle 110 is transmitted from the shaft 150 through gear 148 to driven gear 160 to shaft 162.

The rotation of shaft 162 rotates the drive sprocket 164. The rotation of the drive sprocket 164 rotates the driven sprocket 170 via chain 146. The rotation of the driven sprocket 170, in turn, rotates the shaft 172 which rotates the feed roller 58. The rotation of the feed roller 58 moves the strand 36 along the feed plane 84 towards the cutter tooth 112 and bed knife cutter 88. The rotation of the gears and movement of the strand 36 are simultaneous thus, forming the arc in the strand as seen in FIG. 3.

Once the strand 36 has been cut and the segment 190 severed from the strand, the handle 110 is moved upward to enable the cutting of another segment of the strand. As the handle 110 is moved upward, gear 148, 160, 164 and 170 and their associated shafts rotate in a reverse direction. The roller 58, due to its indexing nature, enables its inner race 96 to rotate in a reverse direction while the outer race 98 firmly maintains the strand 36 in its position. Thus, enabling the present invention to simulate the cutting stroke of an automatic circular cutter. The gears and sprockets may be interchangeable to provide pellets of various lengths or may be connected to a variable speed gear reducer or a 10-speed bicycle transmission to provide greater diversity of the pellet length.

The present invention enables those in the art to utilize a manual system to design circular rotating cutter blades. The present invention enables adjustment of the second member 104 of the cutting mechanism 38 to alter the angular distance, or offset, of the cutting tooth 112 which simulates the offset of the teeth with the rotational axis of the automatic circular cutter. Also, the cutter tooth 112 may be replaced by a different tooth, moved along the finger 114 by removing spacers 192 and 194 to alter the gap between the cutter tooth 112 and the bed knife cutter 88 or any of the above parameters may be adjusted or altered as explained herein. The adjustment of the gap between the cutting tooth 112 and bed knife cutter 88 enables different materials to be cut simulating different gaps as previously explained. Also, the stroke of the cutter tooth 112 may be lengthened by moving the fasteners 118 and 120 in the arcuate slot 106 of the first member 102 which, in turn, provides for longer segments.

Figure 1:
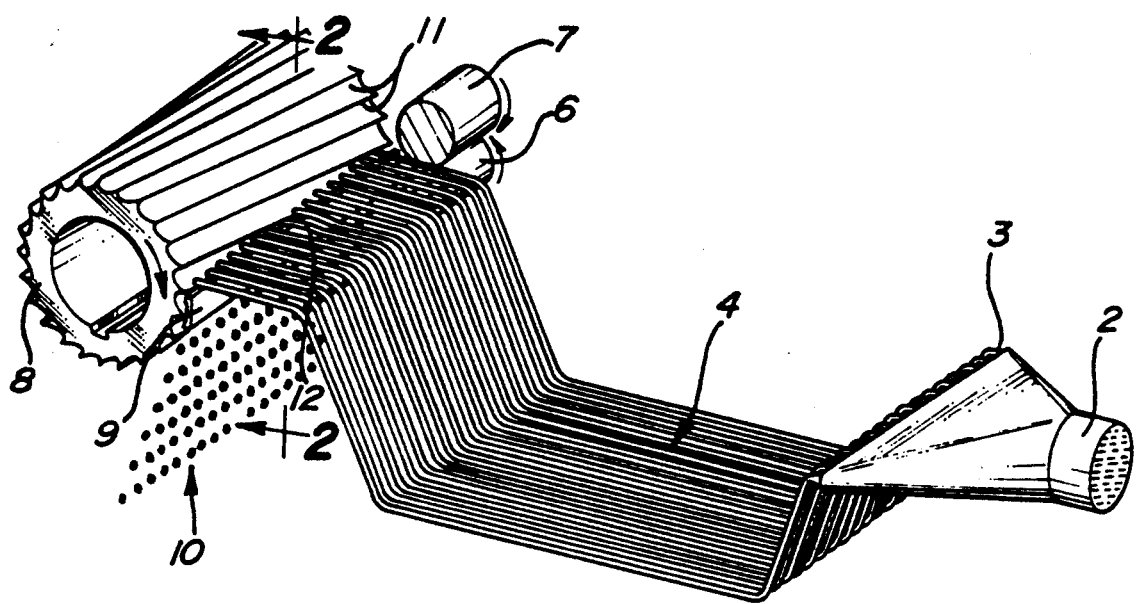
FIG. 1 is a schematic view of a product stream of a strand pelletizing cutter and bed knife.
Figure 2:
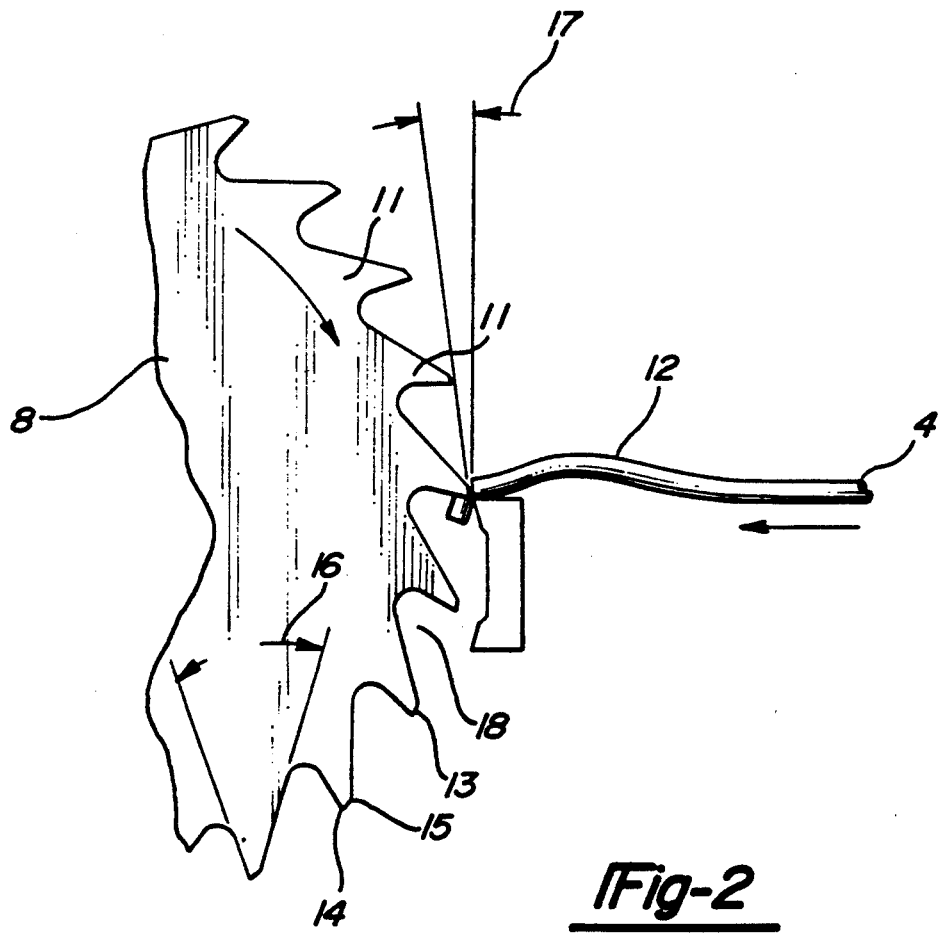
FIG. 2 is a partial cross-section view through a vertical plane through line 2—2 of the circular cutter in FIG. 1.

Thus, the present invention will enable the simulation of substantially all of the previously explained parameters of an automatic circular cutter, as illustrated in FIGS. 1-2. Those in the art of circular cutters may utilize the present invention to further understand and better design automatic circular cutters without the expense involved in designing prototype circular cutters.

While the above detailed description describes the preferred embodiment of the present invention, it will be understood that the present invention is susceptible to modification, variation and alteration without deviating from the scope and fair meaning of the subjoined claims.

What is claimed is:

1. A manually activated apparatus for simulating automatic cutting of plastic strands comprising:
   a mounting frame;
   a feed roller rotatably coupled with said mounting frame;
   a pinch roller rotatably coupled with said mounting frame and positioned adjacent to said feed roller such that a feed plane is defined between said rollers;
   a stationary cutter associated with said mounting frame;
   oscillating cutter means associated with said mounting frame, said oscillating cutter means positioned with respect to said stationary cutter such that strands are adapted to be severed as the oscillating cutter means moves by said stationary cutter said oscillating cutter means being adjustably positioned to a plurality of different cutting positions enabling the oscillating cutter means to pass through a plurality of different cutting paths with respect to said stationary cutter; and
   transmission means adapted for providing simultaneous movement of said oscillating cutter means and said feed roller for feeding said strands between said stationary cutter and oscillating cutter means, said transmission means being manually actuated.

2. The apparatus according to claim 1 wherein said oscillating cutter means further comprising a first member including a cutting blade rotatably mounted with respect to said mounting frame, a second member selectively pivotally mounted on said mounting frame, said first member adjustably positionable with said second member for adjusting stroke of said cutting blade and means for enabling selective pivoting of said second member with respect to said mounting frame for adjusting cutting blade offset with respect to said feed plane.

3. The apparatus according to claim 2 further comprising means for limiting rotation of said first member, said limiting means coupled with said second member.

4. The apparatus according to claim 2 further comprising a handle means for actuating the rotation of said first member.

5. The apparatus according to claim 2 wherein said transmission means further comprises a first driving gear rotatably coupled with said first member, a first driven gear rotatably coupled with said first driving gear, a second driving gear rotatably coupled with said first driven gear and a second driven gear for driving said feed roller, said second driven gear rotatably coupled with said second driving gear.

6. The apparatus according to claim 1 wherein said oscillating cutter means being angularly and rotatably adjustable.

7. A manually operated apparatus for cutting of plastic strands to simulate an automatic circular cutter, said apparatus comprising:
   a mounting frame;
   means adapted for feeding one or more plastic strands each having a longitudinal axis in a direction along said longitudinal axis of the one or more strands, said feeding means coupled with said frame and being manually actuated; and
   means adapted for cutting said one or more plastic strands, said cutting means including a stationary blade member and a movable blade member, said cutting means coupled with said frame and said cutting means movable member being adjustable to a plurality of different cutting positions enabling the cutting means movable member to pass through a plurality of different cutting paths with respect to said frame.

8. The apparatus according to claim 7 wherein said cutting means being angularly adjustable.

9. The apparatus according to claim 7 wherein said feeding means further comprising a feed roller and a pinch roller positioned adjacent to one another such that said one or more strands are fed between said rollers.

10. The apparatus according to claim 7 wherein said cutting means stationary blade member is stationarily affixed with respect to said frame, a reciprocating blade member pivotally mounted with respect to said frame.

11. The apparatus according to claim 7 further comprising transmission means for providing simultaneous movement of said feed means and said cutting means such that as said one or more plastic strands are fed through said feed means said cutting means severs said plastic strands, said transmission means coupled with said feed means and said cutting means.

* * * * *

UNITED STATES PATENT AND TRADEMARK OFFICE
CERTIFICATE OF CORRECTION

PATENT NO. : 5,020,404

DATED : June 4, 1991

INVENTOR(S) : James A. Hoeh

It is certified that error appears in the above-identified patent and that said Letters Patent is hereby corrected as shown below:

ON THE TITLE PAGE, under References Cited, U.S. PATENT DOCUMENTS, after "Muller et al.", "83/350.3X" should be --83/356.3X--.

Column 6, line 47, "206" should be --204--.

Column 7, line 62, claim 1, "activated" should be --actuated--.

Column 10, line 1, claim 10, after "frame" insert --and said movable blade member comprising--.

Signed and Sealed this

Twenty-seventh Day of December, 1994

Attest:

BRUCE LEHMAN

*Attesting Officer*  *Commissioner of Patents and Trademarks*